United States Patent
Rodney (10) Patent No.: US 6,196,335 B1
(45) Date of Patent: Mar. 6, 2001

(54) ENHANCEMENT OF DRILL BIT SEISMICS THROUGH SELECTION OF EVENTS MONITORED AT THE DRILL BIT

(75) Inventor: Paul F. Rodney, Spring, TX (US)

(73) Assignee: Dresser Industries, Inc., Dallas, TX (US)

( * ) Notice: Subject to any disclaimer, the term of this patent is extended or adjusted under 35 U.S.C. 154(b) by 0 days.

(21) Appl. No.: 09/290,366

(22) Filed: Apr. 12, 1999

Related U.S. Application Data
(60) Provisional application No. 60/091,032, filed on Jun. 29, 1998.

(51) Int. Cl.⁷ .................................................. E21B 47/01
(52) U.S. Cl. ........................................ 175/40; 173/152.47
(58) Field of Search ................................ 175/40, 49, 50; 73/152.47

(56) References Cited

U.S. PATENT DOCUMENTS

| | | | |
|---|---|---|---|
| 2,620,386 | 12/1952 | Alspaugh et al. | 177/311 |
| 4,172,250 | 10/1979 | Guignard | 367/27 |
| 4,363,112 | 12/1982 | Widrow | 367/30 |
| 4,365,322 | 12/1982 | Widrow | 367/32 |
| 4,715,451 * | 12/1987 | Bseisu et al. | 175/40 |
| 4,829,489 | 5/1989 | Rector | 367/82 |
| 4,849,945 | 7/1989 | Widrow | 367/30 |
| 4,862,423 | 8/1989 | Rector | 367/25 |
| 4,926,391 | 5/1990 | Rector et al. | 367/41 |
| 4,954,998 | 9/1990 | Rector | 367/82 |
| 4,964,087 | 10/1990 | Widrow | 367/45 |
| 4,965,774 | 10/1990 | Ng et al. | 367/75 |
| 5,050,130 | 9/1991 | Rector et al. | 367/41 |
| 5,109,947 | 5/1992 | Rector, III | 181/106 |
| 5,130,951 | 7/1992 | Kingman | 367/82 |
| 5,131,477 * | 7/1992 | Stagg et al. | 175/40 |
| 5,138,875 | 8/1992 | Booer | 73/151 |
| 5,141,061 * | 8/1992 | Henneuse | 175/56 |
| 5,148,407 | 9/1992 | Haldorsen et al. | 367/32 |
| 5,151,882 | 9/1992 | Kingman | 367/82 |

(List continued on next page.)

FOREIGN PATENT DOCUMENTS

| | | | |
|---|---|---|---|
| 2 700 018 | 12/1992 | (FR) | 1/40 |
| 2273984 | 7/1994 | (GB) | 1/35 |
| 2282664 | 4/1995 | (GB) | 1/52 |
| WO 92/02833 | 2/1992 | (WO) | 1/28 |
| WO 96/18118 | 6/1996 | (WO) | 1/40 |

OTHER PUBLICATIONS

Booer, A.K., et al. "Drillstring Imaging—An Interpretation of Surface Drilling Vibrations." SPE Drilling & Completion, Jun. 1993, pp. 93–98.

Jackson, et al. "Seismic While Drilling: Operational Experiences in Vietnam." World Oil, Mar. 1997, pp. 50–53.

Kamata et al. "Real–Time Seismic–While–Drilling Offers Savings, Improves Safety." Hart's Petroleum Eng'r Int'l, Oct. 1997, pp. 37–39.

Khaled et al. "Seismic–While–Drilling in Kuwait Results and Applications." GeoArabia, vol. 1, No. 4, 1996, Gulf PetroLink, Bahrain, pp. 531–530.

Meehan, Richard et al. "Rekindling Interest in Seismic While Drilling." Oilfield Review, Jan. 1993, pp. 4–13.

Miranda et al. "Impact of the Seismic 'While Drilling' Technique on Exploration Wells." First Break, vol. 14, No. 2, Feb. 1996, pp. 55–68.

(List continued on next page.)

Primary Examiner—Victor Batson
(74) Attorney, Agent, or Firm—Howard L. Speight (57) ABSTRACT

A downhole tool for use at or near the bit measures the vibrations at or near the bit. The tool uses statistical techniques to choose strong events. The tool sends data regarding the strong events to the surface via telemetry.

18 Claims, 4 Drawing Sheets

U.S. PATENT DOCUMENTS

| | | | |
|---|---|---|---|
| 5,191,557 | | 3/1993 | Rector et al. .......................... 367/41 |
| 5,222,048 | | 6/1993 | Grosso et al. .......................... 367/32 |
| 5,303,203 | | 4/1994 | Kingman ................................ 367/75 |
| 5,448,911 | * | 9/1995 | Mason .................................... 73/151 |
| 5,511,038 | | 4/1996 | Angeleri et al. ...................... 367/40 |
| 5,555,530 | | 9/1996 | Meehan .................................. 367/45 |
| 5,585,556 | * | 12/1996 | Petersen et al. .................. 73/152.03 |
| 5,721,376 | | 2/1998 | Pavone et al. .................... 73/152.47 |
| 5,753,812 | * | 5/1998 | Aron et al. ........................ 73/152.47 |
| 5,877,996 | * | 3/1999 | Krokstad et al. ..................... 367/31 |

OTHER PUBLICATIONS

Naville, et al. "Well Seismic—Application of the Trafor MWD System to the Drill Bit Seismic Profiling." EAEG—56th Meeting and Techn. Exh., Vienna, Jun. 1994.

Poletto, Flavio, et al. "Seismic While Drilling Using PDC Signals—Seisbit Experience and Perspectives." EAGE 59th Conference and Technical Exhibition—Geneva, Switzerland, May 26–30, 1997, 2 pp.

Rector, James. "Noise Characterisation and Attentuation in Drill Bit Recordings." Journal of Seismic Exploration, 1992, pp. 379–393.

Rector, James, III, et al. "Radiation Pattern and Seismic Waves Generated by a Working Roller–Cone Drill Bit." Geophysics, vol. 57, No. 10, Oct. 1992, pp. 1319–1333.

Rector, J.W., III, et al. "The Use of Drill–Bit Energy as a Downhole Seismic Source." Geophysics, vol. 56, No. 5, May 1991, pp. 628–634.

Ulrych et al. "Analytic Minimum Entropy Deconvolution." Geophysics, vol. 47, No. 9, Sep. 1982.

Ulrych et al. "Autoregressive Recovery of the Acoustic Impedance." Geophysics, vol. 48, No. 10, Oct. 1983.

Drumheller, Douglas S. "Acoustical Properties of Drill Strings." The Journal of the Acoustical Society of America, Mar. 1989, No. 3, New York.

Drumheller, Douglas S., et al. "The Propagaion of Sound Waves in Drill Strings." The Journal of the Acoustical Society of America. Apr. 1995, No. 4, Woodbury, NY.

Harrison, A.R., et al. "Acquisition and Analysis of Sonic Waveforms From a Borehole Monopole and Dipole Source for Determination of Compressional and Shear Speeds and Their Relation to Rock Mechanical Properties and Surface Seismic Data." 65th Annual Technical Conference and Exhibition of the Society of Petroleum Engineers, New Orleans, LA, Sep. 23–26, 1990. Society of Petroleum Engineers, Copyright 1990.

* cited by examiner

ENHANCEMENT OF DRILL BIT SEISMICS THROUGH SELECTION OF EVENTS MONITORED AT THE DRILL BIT

This application claims priority based on the provisional application entitled "Downhole Collection of Drill Bit Pulse Data," having provisional Ser. No. 60/091,032 filed Jun. 29, 1998. The aforementioned provisional application is hereby incorporated in its entirety by reference.

FIELD OF THE INVENTION

This invention relates to collection of data from the earth using seismic measurements and more particularly collection, at or near a drill bit, of data relating to vibrations of the drill bit.

BACKGROUND OF THE INVENTION

Conventional seismic technology uses surface sources of seismic energy and surface receivers to detect reflections from underground geologic formations such as layers and faults. The collected seismic data can be used to locate the underground formations and guide drilling operations to sources of hydrocarbons.

In Vertical Seismic Profiling ("VSP"), drilling operations are interrupted to place a series of seismic sensors at discrete depths in a borehole being drilled. A surface source releases energy that is reflected off underground geologic formations. The seismic sensors in the borehole sense the reflected energy and provide signals representing the reflections to the surface for analysis. The seismic data is used in analysis of the geology of the earth near the borehole.

In a subsequent development, known as "drill bit seismics", seismic sensors were positioned at the surface near the borehole to sense seismic energy imparted to the earth by the drill bit during drilling. The sensed energy was used in the traditional seismic way to detect reflections from underground geologic formations. Further, this technique was used to detect "shadows", or reduced seismic energy magnitude, caused by underground formations, such as gas reservoirs, between the drill bit and the surface sensors.

Analysis of drill bit seismic data entails determining the amount of time between the generation of the seismic energy by the drill bit and the detection of the seismic energy. This can be accomplished by using a "pilot sensor" near the top of the drillstring to which the drill bit is attached. The pilot sensor detects the vibrations transmitted through the drillstring by the drill bit. Those vibrations, corrected and filtered to account for the delay and distortion caused by the drillstring, can be correlated with the seismic energy received at the surface sensors to determine the distance traveled by the seismic energy received at the surface sensors. With this information, the location of the underground formations can be determined.

Drill bit vibrations can be resolved into "axial" accelerations, which are accelerations in the direction that the drill is drilling, and "lateral" accelerations, which are accelerations perpendicular to axial accelerations.

There is evidence that lateral waves, which are caused by lateral acceleration, generated below the neutral point (the point at which tension is zero) of the drillstring do not propagate to the surface along the drillstring. Accordingly, the pilot sensor will not detect lateral waves generated by the drill bit.

If, however, lateral waves (generated by the drill bit are of sufficient magnitude, it is likely that the bottom hole assembly ("BHA") will contact the borehole wall at random times and at random locations, in an event called a "wall slap". These contacts will generate strong seismic events that will be detected by the surface sensors and the pilot sensor.

The pilot sensor and surface sensor measurements would not indicate that excessive lateral motion (and hence a possible wall slap) is associated with the event. Such an event would be difficult (and probably impossible) to analyze.

SUMMARY OF THE INVENTION

The invention provides an improved reference for drill bit seismics with a downhole tool for use at or near the bit that measures vibrations at or near the bit. The tool has a downhole microcontroller and a very accurate downhole clock (which drifts no more than about 1 ms during the downhole mission). The downhole controller continuously samples the vertical vibration level and compile statistics on the signal being generated by the bit. When a strong event occurs, the time of the onset of the event is recorded and telemetered, for example via mud pulse telemetry, to the surface. The criterion used for picking an event may be very simple. For example, an event might be selected if its amplitude was more than three times the mean amplitude. For random noise, three standard deviations would be chosen. In addition, a minimum time interval can be specified for reporting pulses. Alternatively, the strongest impulse in a pre-set time interval can be selected, and the amplitude and time of the pulse can be telemetered to the surface.

In general, in one aspect, the invention features an apparatus for enhancement of drill bit seismics through selection of events monitored at the drill bit. The apparatus comprises an axial transducer sensitive to axial acceleration of a drill bit. The axial transducer is configured to produce an axial transducer signal representative of the axial acceleration of the drill bit. The apparatus includes an axial sampler coupled to the axial transducer signal which is configured to take samples of the axial transducer signal to produce axial samples. The apparatus includes a lateral transducer sensitive to lateral acceleration of the drill bit and configured to produce a lateral transducer signal representative of the lateral acceleration of the drill bit. The apparatus includes a lateral sampler coupled to the lateral transducer signal. The lateral sampler is configured to take samples of the lateral transducer signal to produce lateral samples. The apparatus includes a pulse selector configured to select axial samples for analysis and to transmit to the surface the axial samples and a time related to the time that the axial samples were sampled.

Implementations of the invention may include one or more of the following. The pulse selector may comprise a clock configured to provide the time when the axial samples and the lateral samples were sampled and a signal processor configured to select the axial samples for analysis by scanning the axial samples to find events comprising contiguous groups of axial samples which meet a criterion. The criterion may comprise the amount of time between the sampling of the first pulse in the event and the sampling of the last pulse in the event being between a lower limit and an upper limit. The criterion may comprise the amplitude of the axial samples in the event not deviating a predetermined multiple of the standard deviation of the magnitudes of the axial samples in the event from the mean of the magnitude of the axial samples in the event for more than a predetermined time. The criterion may comprise the magnitude of the lateral samples taken during the event and for a predetermined time before the event and a predetermined time after the even not exceeding a predetermined amount. The criterion may comprise the amount of time between the sampling of the first sample in the event and the sampling of the last sample in the event being between a lower limit and an upper limit. The criterion may comprise the amplitude of the axial samples in the event not deviating a predetermined number of standard deviations of the magnitude of the axial samples in the event from the mean of the magnitude of the axial samples in the event for more than a predetermined number of milliseconds and the magnitude of the lateral samples taken during the event and for a predetermined time on either side of the event not exceeding a predetermined amount.

The signal processor may be configured to compute the mean and the standard deviation of the magnitudes of the axial samples. The signal processor may be configured to compute a moving average estimate of one or both of the mean and the standard deviation of the magnitude of the axial samples in the event. The signal processor may compute the moving average estimate using the following equation:

$$\langle y_i \rangle = \frac{1}{1+\gamma} \cdot \sum_{j=0}^{i-1} \left(\frac{\gamma}{1+\gamma}\right)^j \cdot y_{j-1} + \left(\frac{\gamma}{1+\gamma}\right)^i \cdot y_0$$

where
$y_i$ is the ith standard deviation or mean to be averaged; and
$\langle y_i \rangle$ is the ith averaged value;
$\langle y_{i-1} \rangle$ is the (i–1)st averaged value; and
$0 < \gamma$.

In general, in another aspect, the invention features a method for enhancement of drill bit seismics through selection of events monitored at the drill bit. The method comprises sampling a signal representative of axial acceleration of a drill bit at a predetermined rate for a predetermined time to produce axial samples, sampling a signal representative of lateral acceleration of a drill bit at a predetermined rate for a predetermined time to produce lateral samples, scanning the axial samples for events, selecting the strongest event from among the events found while scanning, and telemetering a start time and a predetermined number of samples of the strongest event to the surface.

Implementations of the invention may include one or more of the following. The method may further comprise filtering the axial samples prior to scanning. Filtering may comprise digitally filtering the axial samples with a digital bandpass filter having a predetermined pass band. The method may further comprise decimating the axial samples prior to scanning. Decimating may comprise retaining every nth axial sample. The method may further comprise calculating the mean of the axial samples and calculating the standard deviation of the axial samples. Scanning may comprise finding events comprising contiguous axial samples for which: the amount of time between the first sample in the event and the last sample in the event are between a lower limit and an upper limit; the amplitudes of the axial samples in the event do not deviate a predetermined number of standard deviations of the magnitude of the axial samples in the event from the mean of the magnitude of the axial samples in the event for more than a predetermined number of milliseconds; and the magnitudes of the lateral samples taken during the event and for a predetermined time on either side of the event do not exceed a predetermined amount. The method may further comprise calculating the moving average of the standard deviation of the axial samples. The amplitudes of the axial samples in the event may not exceed a predetermined multiple of the moving average of the standard deviations of the magnitude of the axial samples in the event for more than a predetermined number of milliseconds.

The method may comprise modifying adaptively the predetermined amounts if finding produces no events. Scanning comprises convolving the axial samples with a reference pulse to produce a convolved signal; finding the peak in the convolved signal and a time corresponding to the peak; and specifying an event by the time corresponding to the peak of the convolved signal. Selecting may comprise selecting the event with the largest mean magnitude.

DESCRIPTION OF THE PREFERRED EMBODIMENTS

Figure 1:
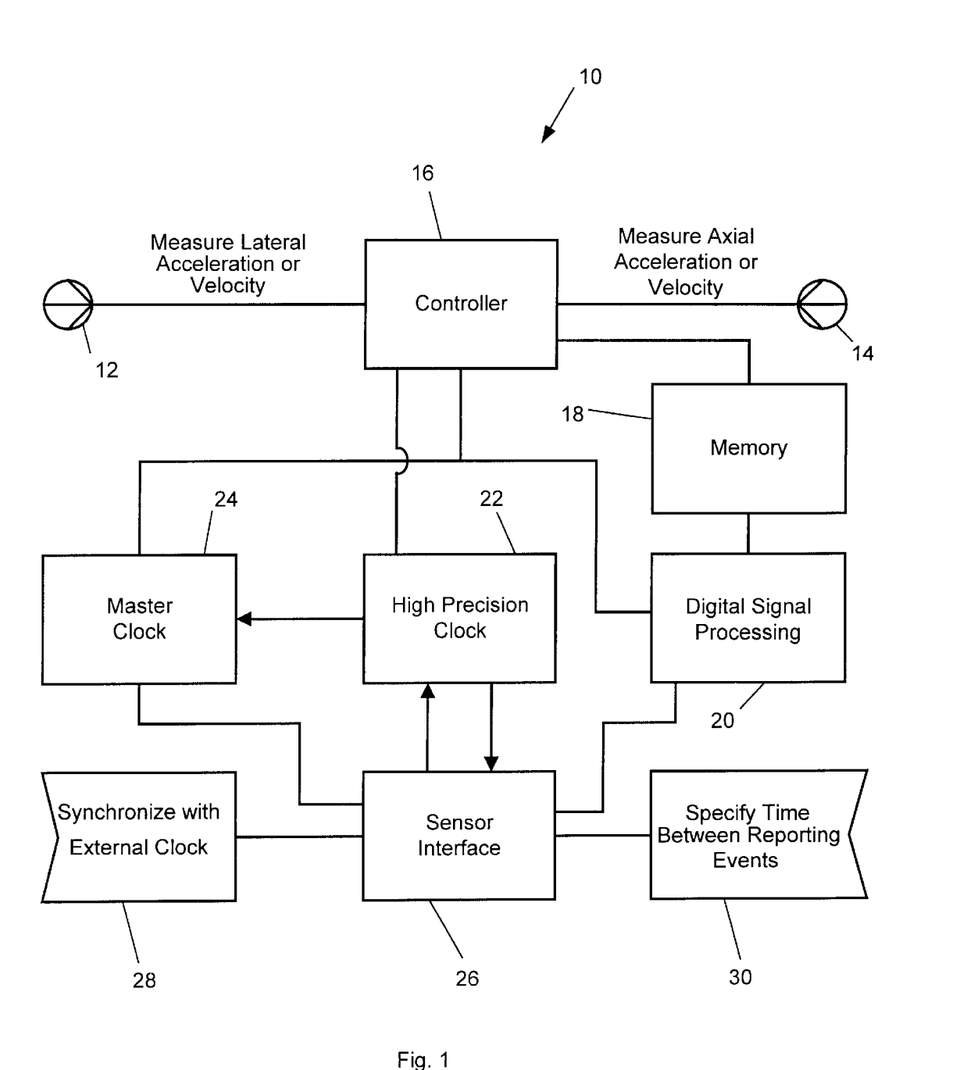
FIG. 1 is a block diagram according to the present invention.

An event logging tool 10 has sensors for measuring axial 12 and optionally lateral 14 acceleration, as shown in FIG. 1. The sensors 12 and 14 are connected to a controller 16. The controller 16 coordinates the sampling of the sensors 12 and 14 and stores the samples in a memory 18. The controller 16 also coordinates the activities of an optional digital signal processing module 20 (the controller can also be designed to carry out the activities of this module). The event logging tool 10 further comprises a high precision clock 22 and a master clock 24, preferably derived from the high precision clock 22 so that all operations can be synchronized with the high precision clock 22. The event logging tool 10 further comprises a sensor interface 26 which allows the event logging tool to send and receive data to other sensors or downhole controllers, or to the outside world. The interface 26 is used for sensor initialization, calibration and performance verification, and to specify operating parameters. The interface 26 has a first port 28 for synchronizing with the external clock and a second port 30 for specifying the time between reporting events.

Upon tool initialization, carried out at the surface before the tool is tripped into the borehole, the tool's internal high precision clock is synchronized with an external high precision clock. In addition, operating parameters are specified, and in particular, the period at which information will be required from the sensor is specified. To be specific, this period will be referred to as T. The tool can be put in a "rest mode" by an external controller in the drillstring, and put into an "active mode" upon command from the same external controller when the tool has reached the bottom of the borehole. When the tool is in the rest mode, the precision clock and sensor interface continue to operate while the rest of the system is in a dormant mode.

When the tool is active, the lateral and axial acceleration are measured at a sampling rate of $1/\tau$ where $\tau \ll T$. To avoid aliasing, it is recommended that $\tau = 1$ ms (i.e. the sensors are sampled at a rate of 1 kHz.) Note that more than one sensor may be involved with the measurement of lateral acceleration as, for example, the sensors described in U.S. Pat. No. 5,720,355. The advantage to this is that lateral motion can be clearly distinguished from other forms of motion. If this approach is taken, an extra signal processing step is needed to extract the lateral motion.

The controller 16 causes M samples to be taken from the lateral acceleration sensor 12 and the axial acceleration sensor 14 during the time interval T, where M is approximately T/τ. The controller 16 stores the M samples from each sensor in memory 18 along with the time (taken from the precision clock 22) at which sampling was started.

After the period T has elapsed, the sampled signals are analyzed to select the best pulse in the interval to report to the surface system. The analysis activity occurs in the digital signal processing block 20, although as noted earlier, the signal processing and controlling function may be handled by a single module with computational capability. In the preferred embodiment, the starting time of a window containing the best pulse is transmitted to the surface along with several samples of data, roughly centered on the pulse. The pulse profile and the time of occurrence of the pulse is used as a reference in the seismic processing system.

Figure 2:
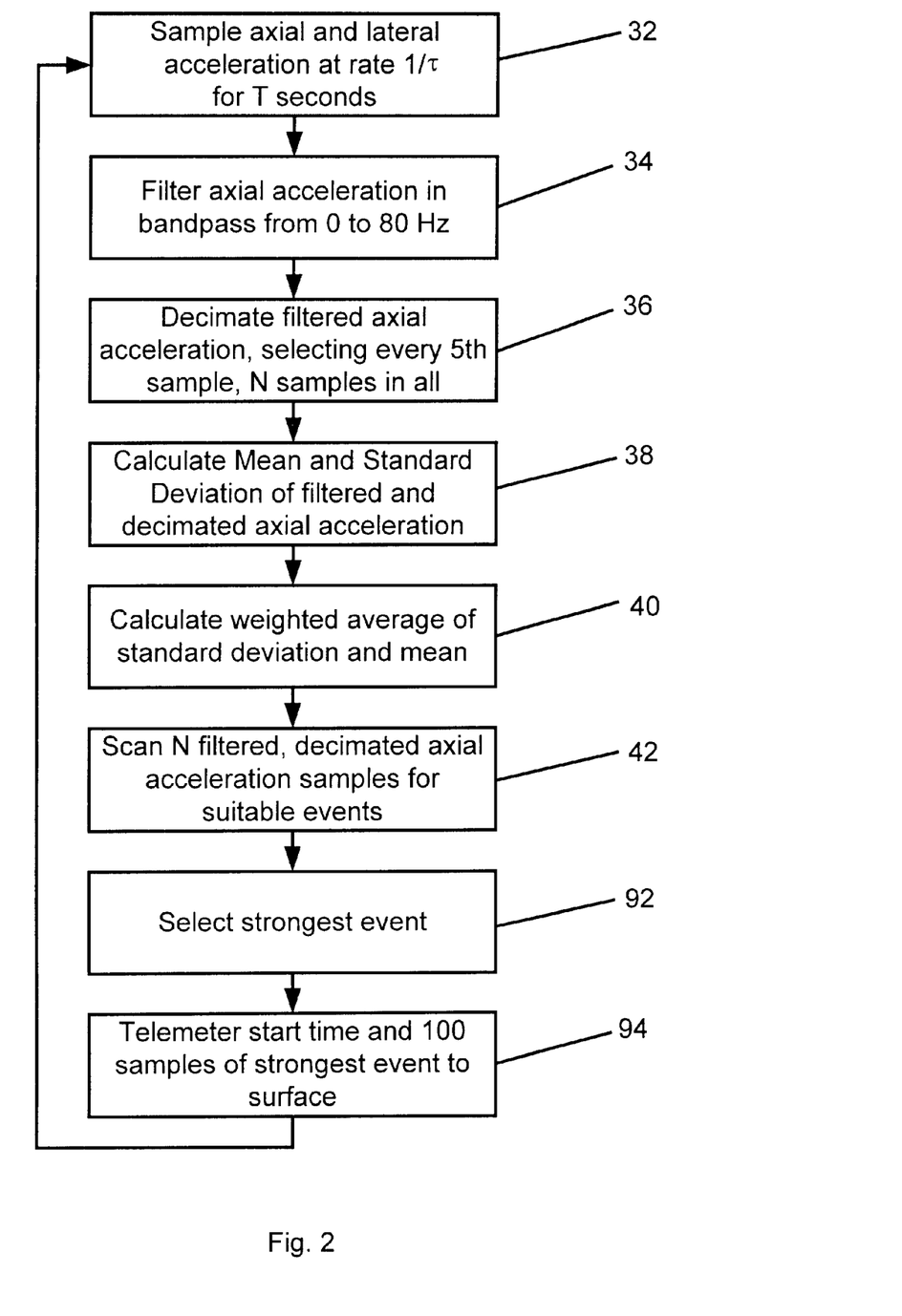
FIGS. 2, 3A and 3B are flowcharts according to the present invention.

The processing performed by the digital signal processor 20 is illustrated in FIG. 2. Axial and lateral acceleration are sampled 30 for T seconds at a rate of $1/\tau$ samples per second. The collected axial acceleration is bandpass filtered 34 between 0 and 80 Hz which can be accomplished with standard digital filtering techniques. The digital filter is of a type that does not introduce an appreciable amount of delay into the signal.

The signal is then compressed (or decimated) 36 by retaining only every fifth sample (for an effective sampling rate of 200 Hz, or a folding frequency of 100 Hz) resulting in N samples. Next, the mean and standard deviation of the (filtered and decinated) axial acceleration are calculated 38 over the N samples. To be specific, let us assume that this is the $i^{th}$ set of data processed in this manner. The mean is calculated by:

$$\overline{ax_i} = \frac{1}{N} \cdot \sum_{j=1}^{N} ax_{i,j}$$

where $ax_{i,j}$ is the $j^{th}$ sample of axial acceleration during the $i^{th}$ sampling interval of period T and $ax_i$ is the average axial acceleration for this $i^{th}$ sampling interval. Similarly, the standard deviation $\sigma ax_i$ is calculated by:

$$\sigma ax_i = \sqrt{\frac{\sum_{j=1}^{N} ax_{i,j}^2 - \left(\sum_{j=1}^{N} ax_{i,j}\right)^2 / N}{N-1}}.$$

The average value is actually of little use in this calculation since its expected value is zero, but it is a free piece of information which is calculated whenever the standard deviation is calculated, and it provides an indication of transducer or amplifier drift.

As was indicated above, fairly sophisticated pulse selection criteria can be used downhole. The mean and standard deviation can be further processed 40 so as to provide a moving average estimate of these parameters. An example of such an averaging technique is given below. In this expression, the symbol yi can stand for either $\overline{ax_i}$ or $\overline{\sigma ax_i}$ obtained above.

$$\langle y_i \rangle = \frac{y_i + \gamma \cdot \langle y_{i-1} \rangle}{1+\gamma}$$

where yi is the $i^{th}$ to be averaged (for example, the $i^{th}$ standard deviation), $[y_{i-1}]$ is $(i-1)^{th}$ averaged value, $[y_i]$ the $i^{th}$ averaged value, and $0<\gamma$. Taking $[y_0]=y_0$, it is easily shown that $$\langle y_i \rangle = \frac{1}{1+\gamma} \cdot \sum_{j=0}^{i-1} \left(\frac{\gamma}{1+\gamma}\right)^j \cdot y_{j-1} + \left(\frac{\gamma}{1+\gamma}\right)^i \cdot y_0$$

from which it is clear that the older a sample is relative to the present sample, the less it contributes to the weighted average. Other filtering techniques can also be used in this step.

Figure 3A:
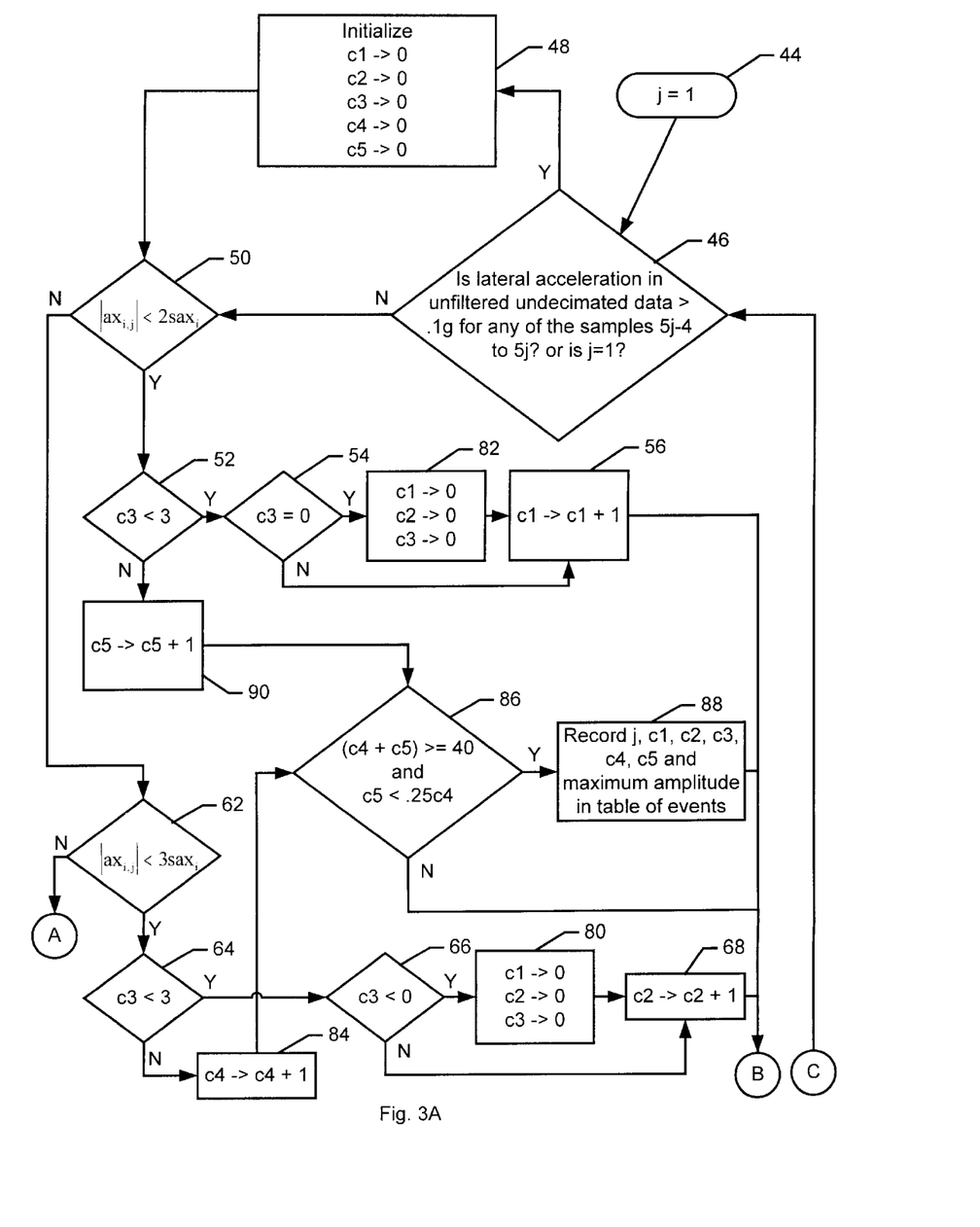
Figure 3B:
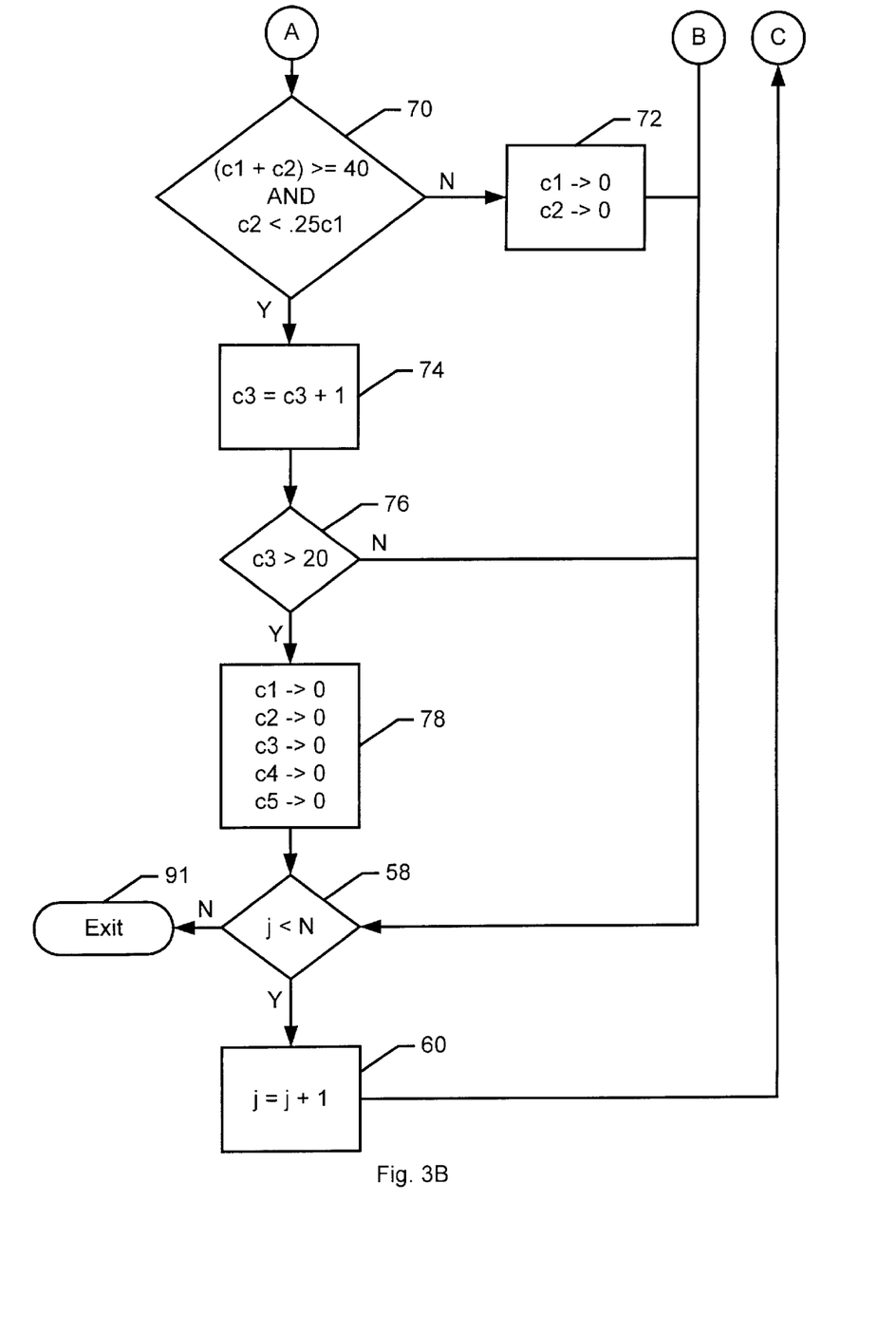

The filtered and decimated axial accelerations are then scanned 42 for suitable events, as shown in greater detail in FIGS. 3A and 3B. The rules implemented by the illustrated algorithm are:

The width of the event must be between two limits. For example, the pulse width should be greater than 12 ms and less than 100 ms; these limits ensure that most of the energy will be in the range of frequencies that can be received at the surface. With the filtered and decimated accelerations, this specification translates to the width being three or more samples, but no greater than 20 samples.

The amplitude must not exceed ±2 standard deviations for a time of 200 ms (40 samples of the filtered and decimated accelerations) on either side of the selected pulse.

Lateral acceleration during the event must not exceed 0.1 g during the pulse and for 200 ms on either side of the pulse. Note there is a slight complication here. In the preferred embodiment, the lateral accelerations are not filtered and decimated. Thus, it is necessary to examine all of the lateral acceleration samples corresponding to a decimated axial acceleration value.

The time of a suitably chosen reference point relative to the pulse is recorded in a location which will be referred to as "the table of events." In FIG. 3, the values of j at the time an event is identified, and c1, c2, c3, c4, and c5 are recorded in the table of events since they can be used to determine beginning and duration of the event.

The maximum amplitude of the event is also recorded in the table of events. To keep FIGS. 3A and 3B as simple as possible, a routine for determining this maximum value is not included, but means for determining peaks within time intervals are well known in the art.

FIGS. 3A and 3B will now be described in detail. "j", which is an index used to determine which samples are being examined, is set 44 to 1. If 46 the unfiltered undecimated lateral acceleration data is greater than 0.1 g for any of the samples 5j–4 through 5j or if j=1, then c1, c2, c3, c4 and c5 are all set 48 to zero. As will be seen, c1 is the number of samples before the pulse where the absolute value of the axial acceleration is less than 2 standard deviations away from the mean axial acceleration. c2 is the number of samples before the pulse where the absolute value of the axial acceleration is greater than 2 standard deviations but less than 3 standard deviations away from the mean axial acceleration. c3 is the number of samples in the pulse, which is defined as consecutive samples greater than 3 standard deviations away from the mean axial acceleration. c4 is the number of samples after the pulse where the absolute value of the axial acceleration is greater than 2 standard deviations but less than 3 standard deviations away from the mean axial acceleration. c5 is the number of samples after the pulse where the absolute value of the axial acceleration is less than 2 standard deviations away from the mean axial acceleration.

After initialization 48 or after it is determined that the lateral acceleration is within limits 46, the absolute value of axial acceleration for sample j is tested 50 to determine if it is less than 2 standard deviations from the mean axial acceleration. If it is, which will be the normal condition before a pulse is detected, then c3 is tested 52 to determine if it is less than 3. Since a pulse has not yet been detected, c3 will be 0. c3 is then tested 54 to determine if it is greater than 0. Since no pulse has arrived, c3 will be equal to 0 and this test will fail. c1 will then be incremented 56. j will then be tested 58 (FIG. 3B) against N to determine if the end of the stored data has been reached. If it has not, j will be incremented 60 and the process will return to block 46 (FIG. 3A). These steps will repeat until a sample is encountered which has an absolute value of axial acceleration greater than 2 standard deviations from the mean.

In that case, blocks 46 and 50 will be executed and the result of the test in block 50 will be negative. Consequently, the absolute value of axial acceleration for sample j is tested 62 to determine if it is less than 3 standard deviations and more than 2 standard deviations from the mean axial acceleration. If it is, then c3 is tested 64 to determine if it is less than 3. Since a pulse has not yet been detected, c3 will be 0. c3 is then tested 66 to determine if it is greater than 0. Since no pulse has arrived, c3 will be equal to 0 and this test will fail. c2 will then be incremented 68. j will then be tested 58 (FIG. 3B) against N to determine if the end of the stored data has been reached. If it has not, j will be incremented 60 and the process will return to block 46 (FIG. 3A). These steps will repeat until a sample is encountered which has an absolute value of axial acceleration greater than 3 standard deviations from the mean, indicating the beginning of a pulse.

In that case, blocks 46, 50 and 62 will be executed and the result of the test in block 62 will be negative. c1 and c2 will then be tested 70 (FIG. 3B) to determine if their sum is greater than or equal to 40 and if c2 is less than 0.25 times c1. This tests to see if the pulse was preceded by a period where the amplitude of axial acceleration was less than 3 standard deviations for at least 40 samples and that the period where the axial acceleration was between 2 and 3 standard deviations was greater than or equal to one quarter of the period that it was less than 2 standard deviations. If either of those tests fail, c1 and c2 are set to zero, which assures that the following pulse will not be recorded.

If both tests in block 70 pass, however, c3 is incremented 74 indicating that a pulse is in progress. c3 is then tested 76 to determine if the pulse is too long by comparing it to 20. If it is, c1, c2, c3, c4 and c5 are set 78 to zero, which assures that the following pulse will not be recorded. In either case, j is compared 58 to N and incremented 60, as before.

Assume the next sample of axial acceleration has an absolute value between 2 and 3 standard deviations from the mean. Blocks 46, 50, 62 and 64 are executed with the test of block 64 having a positive outcome because c3=1. Block 66 will also have a positive outcome. Consequently, c1, c2 and c3 are set 80 to zero, which assures that the single excursion of axial acceleration above 3 standard deviations will not be recorded as a pulse. This series of steps assures that the pulse must be at least 3 samples long.

Replace the assumption of the previous paragraph with the assumption that the next sample of axial acceleration has an absolute value less than 2 standard deviations from the mean. Blocks 46, 50 and 52 are executed with the test of block 52 having a positive outcome because c3=1. Block 54 will also have a positive outcome. Consequently, c1, c2 and c3 are set 82 to zero, which assures that the single excursion of axial acceleration above 3 standard deviations will not be recorded as a pulse. This series of steps assures that the pulse must be at least 3 samples long.

Replace the previous two assumptions with the assumptions that at least 3 consecutive samples of axial acceleration were encountered having absolute values greater than 3 standard deviations from the mean and that the next sample is between 2 and 3 standard deviations from the mean. In this case, blocks 46, 50, 62 and 64 will be executed, and the outcome of the test of block 64 will be negative because c3 is greater than 3. c4 is incremented 84. c4 and c5 will then be tested 86 to determine if their sum is greater than or equal to 40 and if c5 is less than 0.25 times c4. This tests to see if the pulse was followed by a period where the amplitude of axial acceleration was less than 3 standard deviations for at least 40 samples and that the period where the axial acceleration was between 2 and 3 standard deviations was greater than or equal to one quarter of the period that it was less than 2 standard deviations. If both tests pass, j, c1, c2, c3, c4, c5 and the maximum amplitude are recorded in the table of events.

Assume that the next sample is less than 2 standard deviations from the mean. In this case, blocks 46, 50 and 52 will be executed, and the outcome of the test of block 52 will be negative because c3 is greater than 3. c5 is incremented 90. c4 and c5 will then be tested 90, as discussed above.

Once the entire interval of N filtered and decimated samples has been examined the scan algorithm exits 91 (FIG. 3B), and the table of events is examined 92 (FIG. 2) to determine which event had the largest amplitude. The precise time corresponding to filtered and decimated sample j−(c1+c2+c3+c4+c5) is transmitted 94 to the surface followed by 100 filtered, decimated axial acceleration values beginning with this sample (these constitute ½ second of data). Assuming these samples are transmitted to an accuracy of 8 bits, this corresponds to 800 bits of information, which can be transmitted to the surface, along with the precise time of the start of the interval in less than 7 minutes (assuming a two bit per second telemetry rate, which is reasonable for mud pulse telemetry systems). If no qualifying events were observed in the specified time interval, an error code would be transmitted to the surface.

There are several other ways of carrying out the general objective of selecting a pulse that is suitable for analysis as a seismic event. For example, the axial acceleration can be convolved with a reference pulse, and the time of the maximum in the convolved signal can be used to specify the center of a seismic event. In addition, the selection criteria could also be set adaptively. For example, suppose that no qualifying events occur during several of the specified time intervals. The controller could be programmed to allowing noisier samples to be selected in such an event.

The foregoing describes preferred embodiments of the invention and is given by way of example only. For example, it lateral vibrations are sensed, the pulse selection criteria might include a requirement that the lateral vibration amplitude be below a pre-set level before the pulse could be recorded. Further, if shear wave seismics are being implemented, the same strategy could be followed using the output of a downhole rotation sensor. The invention is not limited to any of the specific features described herein, but includes all variations thereof within the scope of the appended claims.

What is claimed is:

1. An apparatus for enhancement of drill bit seismics through selection of events monitored at the drill bit comprising an axial transducer sensitive to axial acceleration of a drill bit, the axial transducer configured to produce an axial transducer signal representative of the axial acceleration of the drill bit;

an axial sampler coupled to the axial transducer signal, the axial sampler configured to take samples of the axial transducer signal to produce axial samples;

a lateral transducer sensitive to lateral acceleration of the drill bit, the lateral transducer configured to produce a lateral transducer signal representative of the lateral acceleration of the drill bit;

a lateral sampler coupled to the lateral transducer signal, the lateral sampler configured to take samples of the lateral transducer signal to produce lateral samples; and a pulse selector configured to select axial samples for analysis and to transmit to the surface the axial samples and a time related to the time that the axial samples were sampled.

2. The apparatus of claim 1 wherein the pulse selector comprises a clock configured to provide the time when the axial samples and the lateral samples were sampled; and a signal processor configured to select the axial samples for analysis by scanning the axial samples to find events comprising contiguous groups of axial samples which meet a criterion.

3. The apparatus of claim 2 wherein the criterion comprises the amount of time between the sampling of the first pulse in the event and the sampling of the last pulse in the event being between a lower limit and an upper limit.

4. The apparatus of claim 2 wherein the criterion comprises the amplitude of the axial samples in the event not deviating a predetermined multiple of the standard deviation of the magnitudes of the axial samples in the event from the mean of the magnitude of the axial samples in the event for more than a predetermined time.

5. The apparatus of claim 2 wherein the criterion comprises the magnitude of the lateral samples taken during the event and for a predetermined time before the event and a predetermined time after the even not exceeding a predetermined amount.

6. The apparatus of claim 2 wherein the criterion comprises the amount of time between the sampling of the first sample in the event and the sampling of the last sample in the event being between a lower limit and an upper limit;

the amplitude of the axial samples in the event not deviating a predetermined number of standard deviations of the magnitude of the axial samples in the event from the mean of the magnitude of the axial samples in the event for more than a predetermined number of milliseconds; and the magnitude of the lateral samples taken during the event and for a predetermined time on either side of the event not exceeding a predetermined amount.

7. The apparatus of claim 2 wherein the signal processor is configured to compute the mean and the standard deviation of the magnitudes of the axial samples.

8. The apparatus of claim 2 wherein the signal processor is configured to compute a moving average estimate of one or both of the mean and the standard deviation of the magnitude of the axial samples in the event.

9. The apparatus of claim 8 wherein the signal processor computes the moving average estimate using the following equation:

$$\langle y_i \rangle = \frac{1}{1+\gamma} \cdot \sum_{j=0}^{i-1} \left(\frac{\gamma}{1+\gamma}\right)^j \cdot y_{j-1} + \left(\frac{\gamma}{1+\gamma}\right)^i \cdot y_0$$

where $y_i$ is the ith standard deviation or mean to be averaged; and $\langle y_i \rangle$ is the ith averaged value;

$\langle y_{i-1} \rangle$ is the (i−1)st averaged value; and $0 < \gamma$.

10. A method for enhancement of drill bit seismics through selection of events monitored at the drill bit comprising sampling a signal representative of axial acceleration of a drill bit at a predetermined rate for a predetermined time to produce axial samples;

sampling a signal representative of lateral acceleration of a drill bit at a predetermined rate for a predetermined time to produce lateral samples;

scanning the axial samples for events;

selecting the strongest event from among the events found while scanning; and telemetering a start time and a predetermined number of samples of the strongest event to the surface.

11. The method of claim 10 further comprising filtering the axial samples prior to scanning, filtering comprising digitally filtering the axial samples with a digital bandpass filter having a predetermined pass band.

12. The method of claim 10 further comprising decimating the axial samples prior to scanning, decimating comprising retaining every nth axial sample.

13. The method of claim 10 further comprising calculating the mean of the axial samples;

calculating the standard deviation of the axial samples; and wherein scanning comprises finding events comprising contiguous axial samples for which:

the amount of time between the first sample in the event and the last sample in the event are between a lower limit and an upper limit;

the amplitudes of the axial samples in the event do not deviate a predetermined number of standard deviations of the magnitude of the axial samples in the event from the mean of the magnitude of the axial samples in the event for more than a predetermined number of milliseconds; and the magnitudes of the lateral samples taken during the event and for a predetermined time on either side of the event do not exceed a predetermined amount.

14. The method of claim 13 further comprising calculating the moving average of the standard deviation of the axial samples.

15. The method of claim 14 wherein the amplitudes of the axial samples in the event do not exceed a predetermined multiple of the moving average of the standard deviations of the magnitude of the axial samples in the event for more than a predetermined number of milliseconds.

16. The method of claim 13 comprising modifying adaptively the predetermined amounts if finding produces no events.

17. The method of claim 10 wherein scanning comprises convolving the axial samples with a reference pulse to produce a convolved signal;

finding the peak in the convolved signal and a time corresponding to the peak; and specifying an event by the time corresponding to the peak of the convolved signal.

18. The method of claim 10 wherein selecting comprises selecting the event with the largest mean magnitude.

* * * * *